United States Patent [19]

Hyde, Jr.

[11] 3,951,436
[45] Apr. 20, 1976

[54] WATER RESISTANT CONDUIT FITTING
[75] Inventor: David F. Hyde, Jr., Norridge, Ill.
[73] Assignee: Midwest Electric Manufacturing Company, Chicago, Ill.
[22] Filed: Jan. 6, 1975
[21] Appl. No.: 538,948

Related U.S. Application Data
[63] Continuation of Ser. No. 397,687, Sept. 17, 1973, abandoned.

[52] U.S. Cl. .................. 285/27; 285/110; 285/178; 285/404
[51] Int. Cl.² .................................. F16L 21/00
[58] Field of Search ............. 285/235, 8, 404, 110, 285/374, 178, 403, 44, 43, 42, 27; 403/50, 51; 174/77 R, 93; 277/212 C

[56] References Cited
UNITED STATES PATENTS
| | | | |
|---|---|---|---|
| 603,222 | 4/1898 | McLean | 285/235 |
| 1,292,524 | 1/1919 | Serrell | 285/8 |
| 1,831,856 | 11/1931 | Fullman | 285/404 |
| 2,510,477 | 6/1950 | Montgomery | 285/110 X |
| 3,596,231 | 7/1971 | Melton | 174/93 X |
| 3,680,896 | 8/1972 | Cupit | 285/178 X |
| 3,685,858 | 8/1972 | Wandler | 285/404 X |

FOREIGN PATENTS OR APPLICATIONS
| | | | |
|---|---|---|---|
| 589,978 | 1/1960 | Canada | 285/110 |
| 1,432,704 | 2/1966 | France | 285/110 |

*Primary Examiner*—Thomas F. Callaghan
*Attorney, Agent, or Firm*—Olson, Trexler, Wolters, Bushnell & Fosse, Ltd.

[57] ABSTRACT

A set screw type conduit fitting is provided with a rubber or plastic boot having a radically inwardly directed circumferential flange engaging a complementary conduit to render the combination water resistant and at least partially airtight.

5 Claims, 5 Drawing Figures

U.S. Patent   April 20, 1976   3,951,436
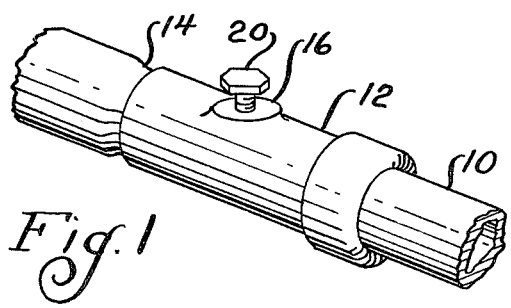
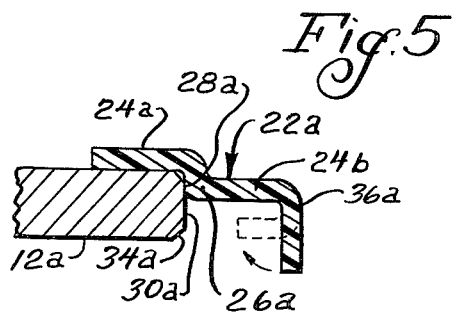
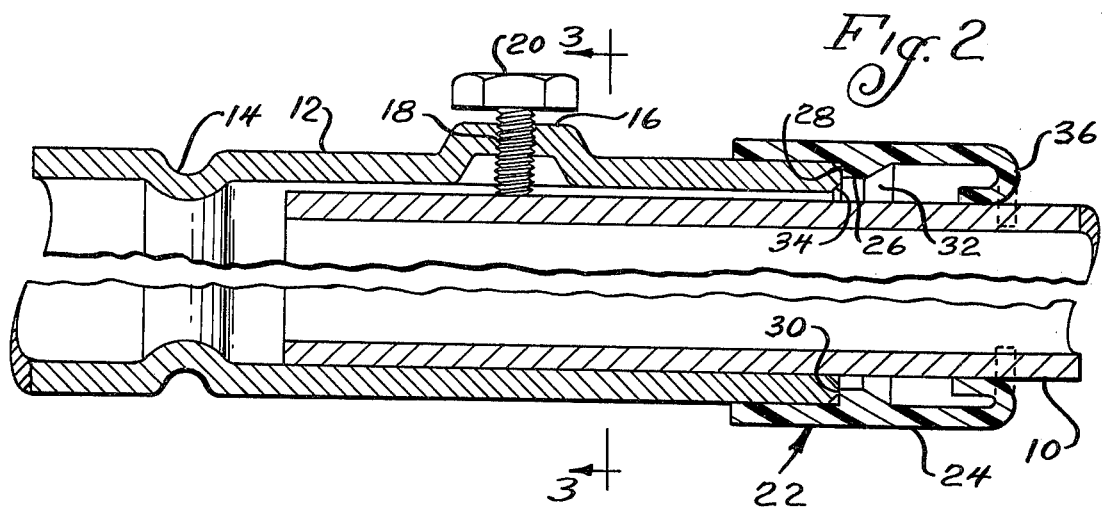
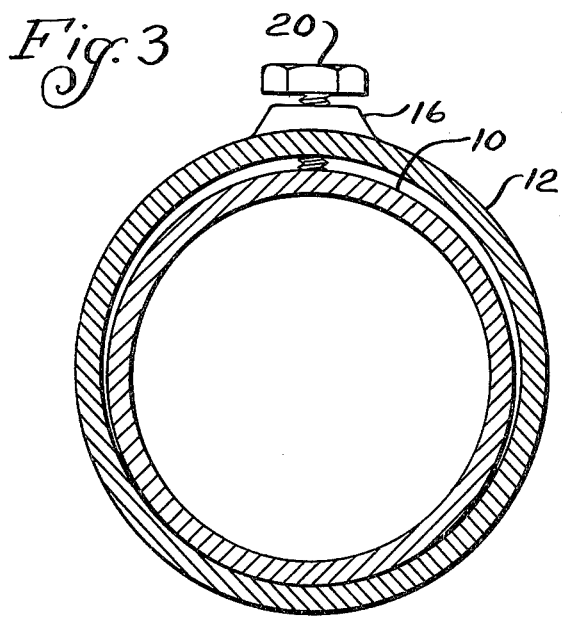
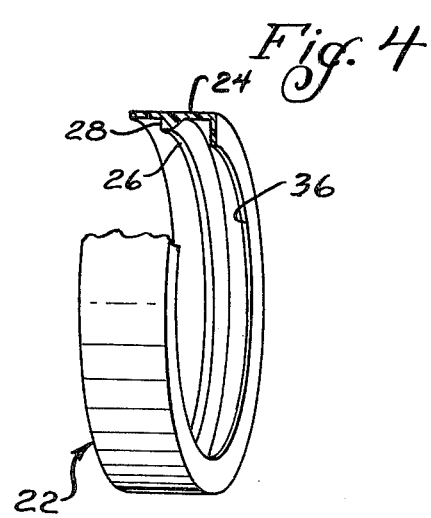

WATER RESISTANT CONDUIT FITTING

REFERENCE TO RELATED APPLICATIONS

This is a continuing application of application Ser. No. 397,687, filed Sept. 17, 1973 and now abandoned.

BACKGROUND AND OBJECTS OF THE INVENTION

Fittings are used for connecting the ends of either rigid or thinwall conduit. Fittings include connectors which connect the conduit to a box, and also couplings which connect two lengths of conduit to one another. There are two basic types of fittings, namely the compression type fitting, and the set screw type fitting. The set screw type fitting has certain practical advantages, namely it is less expensive to manufacture and it is quicker in installation time. Furthermore, it may be used in close quarters where there would not be room to apply a wrench to a compression fitting.

Compression type fittings are readily rendered raintight, or water resistant. The advantages of raintightness will be obvious. In addition, such fittings can be made relatively airtight, and this is an advantage in some construction projects in which fish tape is moved through a length of conduit by air pressure differential, generally by application of compressed air at one end, and often by vacuum assist at the other end. The fish tape is then used to pull a large number of wires through the conduit simultaneously.

Heretofore set screw type fittings have been unsatisfactory as to raintightness and as to air leakage, making it difficult to blow a fish tape through a long length of conduit connected with set screw type fittings. Since the set screws are applied from one side only, the conduit and the fittings necessarily end up slightly eccentric relative to one another. Coupled with this, in a case of a 4-inch diameter conduit the outside diameter of the conduit may vary as much as 0.040 inch, while the inside diameter of the fitting may vary 0.020 inch. Such errors in nominal dimension may be cumulative, providing as much as 0.060 inch error.

The object of the present invention is to provide a rubber or plastic boot on one or both ends of a conduit fitting to render the connection between the fitting and the conduit raintight, and relatively airtight.

SUMMARY OF THE INVENTION

A cylindrical rubber or plastic boot is mounted over the end of the fitting and is provided with an internal stop to limit the depth of penetration. The boot is secured on the fitting by satisfactory means, such as adhesive, heat bonding, or heat shrinking. The end of the boot extends beyond the end of the fitting and is provided with a circumferential, radially inwardly extending flexible flange which deforms to a greater or lesser degree to conform to the exterior of the conduit with which the fitting is assembled.

BRIEF DESCRIPTION OF THE DRAWINGS

The objects and advantages of the present invention will be best understood with reference to the following specification when taken in connection with the accompanying drawings wherein:

FIG. 1 is a perspective view illustrating a raintight set screw type conduit fitting in accordance with the present invention;

FIG. 2 is a longitudinal sectional view therethrough;

FIG. 3 is a cross-sectional view on an enlarged scale taken substantially along the line 3—3 in FIG. 2;

FIG. 4 is a perspective view of a boot as used with smaller size fittings; and

FIG. 5 is a fragmentary longitudinal sectional view showing a modified boot as used with larger size rigid conduit.

DETAILED DESCRIPTION OF THE ILLUSTRATED EMBODIMENTS

Turning now in greater particularity to the drawings, and first to FIGS. 1–4, there will be seen a fragmentary section of conduit 10. This may be rigid conduit, or the type of thin-wall conduit commonly known as E.M.T. (Electric Metallic Tubing). A set screw type fitting 12 is installed over the end of the conduit 10, and is of generally conventional construction, having a circumferential indentation 14 providing an internal stop limiting the depth of penetration of the conduit. The left end of the fitting (not shown) may either be a duplicate of the right end when the fitting is a coupling, or it may be threaded for attachment to a box when it comprises a connector. The fitting is provided with one or more protuberances or bosses 16 each having a threaded bore 18 therethrough receiving a set screw 20 for tightening against the side of the conduit 10 to secure the fitting on the conduit, all as is known in the prior art.

In accordance with the present invention the free end of the fitting is provided with a plastic or rubber boot 22 having a cylindrical body 24 with an internal protuberance 26 providing a right angle shoulder 28 which is abutted by the end 30 of the fitting to limit the depth of penetration of the fitting into the boot. The boot is secured to the fitting, either by an adhesive between the inner surface of the body and the outer surface of the fitting, or by heat bonding, or by heat shrinking the boot in place, or by other suitable means. The protuberance 26 on the axial end opposite to the right angle shoulder 28 is beveled at 32 to aid in centering the conduit 10 in the fitting as the fitting and conduit are telescopically associated. As will be recognized, the inner end of the fitting also is beveled at 34, and this likewise aids assembly. The outer edge also may be beveled, but this is not of particular interest at the present time.

Body 24 extends well beyond the protuberance or stop 26, and its outer end is provided with a circumferential, inwardly directed flange 36. As will be seen in FIG. 4, and in broken lines in FIG. 2, this flange initially extends in substantially a right angle to the body 24. As is shown in solid lines in FIG. 2, the flange deflects and may stretch about the conduit 10 to form a raintight engagement therewith when the conduit is inserted.

As has been mentioned heretofore, and as will be seen in FIG. 2, and particularly in FIG. 3, the conduit 10 is to a greater or lesser degree eccentric relative to the fitting 12, depending somewhat on the accumulation of error or dimensional tolerances in the outside diameter of the conduit and the inside diameter of the fitting. Thus, the flange 36 will deflect to a greater degree on one portion of the conduit than on another portion. Specifically, on the side opposite to the set screw 20, this being the bottom in FIGS. 2 and 3, the flange 36 will deflect to a greater degree than on the side on which the set screw is located. In general, it is contemplated that the flange on the side opposite the set screw will deflect on the order of 180°. On the same side as the set screw it may deflect as much as 180°, or it may deflect as little as about 30°, the exact degree depending somewhat on the size of the fitting and conduit, and also on the degree of eccentricity.

The example as heretofore shown and described is for smaller sizes of conduit and fittings, for example on the order of ½ to 1 inch inside diameter. For larger diameters, such as on the order of 2½ inches inside diameter and up, a modification of the boot is used as is shown in FIG. 5. In this figure similar numerals are used with the addition of the suffix a. The boot 22a is provided with an outer or larger diameter body section 24a, while the protuberance 26a is provided by an inward offset in the boot, thereby providing an internal right angle shoulder 28a abutting the outer end 30a of the fitting. The body continues outwardly in a reduced diameter portion 24b, having at its outer end a circumferential, inwardly directed flange 36a normally extending inwardly at substantially right angles, as shown in solid lines in FIG. 5, and deflectable to varying degrees on the order of 30° to 180° upon assembly with the conduit, depending on the circumferential location. As will be apparent, with the larger diameter fitting more rubber or plastic material is required to make the boot. Utilization of the shape of FIG. 5 with the outer body portion of restricted diamter to provide the internal stop minimizes the amount of rubber or plastic material required compared with the provision of a protuberance to form the internal stop as in FIGS. 2 and 4.

It will now be apparent that I have provided a rubber or plastic (polyethylene being a preferred example) boot on a conduit fitting for assembly with conduit. This provides visible seal, thereby assuring inspectors and others of a raintight construction. The boot compensates for eccentricity, and compensates for a possible angular conduit endcut. It seals against imperfect installation, compensates for tolerances, and eliminates leakage so that vacuum or pressure type fish tape feeding can be used. The design is for both couplings and connectors, and is applicable either to a rigid conduit or to thinwall or E.M.T. tubing.

The specific examples of the invention as herein shown and described are for illustrative purposes only. Various changes in structure will no doubt occur to those skilled in the art, and will be understood as forming part of the invention insofar as they fall within the spirit and scope of the appended claims.

The invention is claimed as follows:

1. A water resistant conduit fitting comprising a cylindrical body of predetermined diameter having an open end telescopically receiving therein the end of a length of conduit of lesser diameter and having an inwardly directed set screw adapted to bear against the side surface of the inserted length of conduit to secure said fitting to said conduit with the surface portion of the conduit opposite the set screw contacting the inner surface of the cylindrical body of the fitting, and a free-standing resilient elastomeric boot externally secured on and extending beyond the open end of said cylindrical body, said boot including a cylindrical portion having a longitudinal axis with a radially inwardly projecting intermediate inner stop abutting the open end of said cylindrical body with said cylindrical portion extending axially beyond said stop away from said cylindrical body to a self-supporting end portion spaced exteriorly outwardly from the conduit and terminating in a circumferential initially generally radially inwardly extending substantially planar flange of uniform thickness and of finite extent radially of said boot and substantially perpendicular to said axis adjacent the extending end of said cylindrical portion forming an outer shoulder therewith and presenting an inner aperture of less diameter than that of the conduit, said flange, thus comprising an apertured diaphragm having an inner marginal portion that is stretched and deflected by the outer wall of the length of conduit inserted into said fitting with permissive differential spacing of the outer surface of the deflected flange relative to the inner surface of the cylindrical portion adjacent the end portion of the boot to compensate for eccentricity and misalignment between the conduit and fitting for proper sealing, said boot being externally free and unrestrained.

2. A fitting as set forth in claim 1, wherein said stop presents a substantially right angle shoulder to said cylindrical body and has a bevel surface extending away therefrom to facilitate receipt of a length of conduit.

3. A fitting as set forth in claim 1, wherein said stop comprises an inward circumferential projection.

4. A fitting as set forth in claim 3, wherein said cylindrical portion of said resilient boot is of substantially uniform diameter.

5. A fitting as set forth in claim 3, wherein the outer end of said cylindrical portion of said boot is of reduced diameter relative to the inner end of said cylindrical portion, the reduction in diameter providing said stop.

* * * * *